United States Patent
Di Nicolantonio et al.

(10) Patent No.: US 6,719,953 B2
(45) Date of Patent: Apr. 13, 2004

(54) PROCESS FOR THE MANUFACTURE OF OLEFINS BY A PYROLYSIS FURNACE WITH AN INTERNALLY FINNED U SHAPED RADIANT COIL

(75) Inventors: Arthur R. Di Nicolantonio, Seabrook, TX (US); David B. Spicer, Houston, TX (US); Victor K. Wei, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 10/135,634

(22) Filed: Apr. 30, 2002

(65) Prior Publication Data
US 2002/0159934 A1 Oct. 31, 2002

Related U.S. Application Data

(62) Division of application No. 09/094,407, filed on Jun. 9, 1998, now Pat. No. 6,419,885.
(60) Provisional application No. 60/049,529, filed on Jun. 10, 1997.

(51) Int. Cl.[7] .............................. F28F 1/40; F28F 1/14; F28F 1/36
(52) U.S. Cl. ....................... 422/198; 422/200; 422/205; 422/312; 165/177; 165/183; 165/184
(58) Field of Search ................................ 422/196, 197, 422/198, 200, 205, 312, 206; 165/181, 182, 183, 184, 133, 177; 288/183

(56) References Cited

U.S. PATENT DOCUMENTS

| | | | |
|---|---|---|---|
| 4,297,147 A | * 10/1981 | Nunciato et al. | 134/7 |
| 4,342,242 A | 8/1982 | Schaum | 83/435.17 |
| 4,827,074 A | 5/1989 | Suwa et al. | 585/648 |
| 5,271,809 A | 12/1993 | Holzhausen | 196/110 |
| 5,409,675 A | 4/1995 | Narayanan | 422/197 |

FOREIGN PATENT DOCUMENTS

| | | |
|---|---|---|
| EP | 305799 | 3/1989 |
| EP | 0 668 114 | 8/1995 |
| GB | 2 148 758 | 6/1985 |
| WO | 969796 | 9/1984 |

OTHER PUBLICATIONS

Wells, T.A., *Speciality Furnace Design Steam Reformers and Steam Crackers,* AIChE Spring National Meeting (Mar. 1988).

Albano, J.V., et al. *Applications of Extended Surfaces in Pyrolysis Coils,* Energy Progress, pp. 160–168 (Sep. 1988).

Brown, David J., et al., *USC Super U Pyrolysis Concept,* AIChE Spring National Meeting (Mar. 1990).

* cited by examiner

*Primary Examiner*—Jerry D. Johnson
*Assistant Examiner*—Alexa A. Doroshenk

(57) ABSTRACT

The present invention is directed towards a fired heater for heating a process fluid that uses U tubes provided with increased internal heat transfer surface to reduce tube metal temperatures and coking. and at the same time is not prone to plugging from coke. The fired heater comprises a radiant section enclosure with a number of U tubes in the radiant section. The U tubes are formed by connecting one or more tubular sections, and the U tubes are provided with internal generally longitudinal fins. The invention also is directed towards a process utilizing a fined heater with U tubes as disclosed for producing olefins from hydrocarbon feedstocks.

28 Claims, 3 Drawing Sheets

PROCESS FOR THE MANUFACTURE OF OLEFINS BY A PYROLYSIS FURNACE WITH AN INTERNALLY FINNED U SHAPED RADIANT COIL

This application is a divisional of U.S. application Ser. No. 09/094,407, filed Jun. 9, 1998, now U.S. Pat. No. 6,419,885, which claims the benefit of U.S. Provisional Application No. 60/049,529, filed Jun. 10, 1997.

FIELD OF THE INVENTION

The present invention relates to a fired heater for heating process fluids, e.g., process heaters. More specifically, it relates to a fired heater of the type which comprises at least one radiant section in which process fluid flowing through tubes therein is indirectly heated, preferably, by radiant energy provided by burners. The methods and apparatus used in accordance with the present invention are particularly well suited and advantageous for pyrolysis of normally liquid or normally gaseous aromatic and/or aliphatic hydrocarbon feedstocks such as ethane, propane, naphtha or gas oil to produce ethylene and other by products such as acetylene, propylene, butadiene, etc. Accordingly, the present invention will be described and explained in the context of hydrocarbon pyrolysis, particularly steam cracking to produce ethylene.

BACKGROUND OF THE INVENTION

Steam-cracking is the predominant commercial method for producing-light olefins such as ethylene, propylene and butadiene. Ethylene, propylene, and butadiene are basic building block chemicals used in the manufacture of high volume polymeric materials and commercially important chemical intermediates. The demand for these basic building block petrochemicals is expected to continue to grow in the foreseeable future. Of the products produced in steam cracking, ethylene has the highest demand, and is the most costly to separate and purify. Therefore improving the yield or selectivity of ethylene is highly desired. Steam cracking involves a thermal cracking reaction typically carried out in a fired tubular reactor. Reactor selectivity to ethylene is favored by short residence time and low hydrocarbon partial pressures. Hydrocarbon feeds ranging from ethane to vacuum gas-oil are used, and the reaction is conducted in the presence of dilution steam. The complex reactions and the tubular reactor are extensively discussed in both public domain literature and numerous patents.

Steam cracking of hydrocarbons has typically been effected by supplying the feedstock in vaporized or substantially vaporized form, in admixture with substantial amounts of dilution steam, to suitable coils in a cracking furnace. It is conventional to pass the reaction mixture through a number of parallel coils or tubes which pass through a convection section of the cracking furnace wherein hot combustion gases raise the temperature of the feed and dilution steam. Each coil or tube then passes through a radiant section of the cracking furnace wherein a multiplicity of burners supply the heat necessary to bring the reactants to the desired reaction temperature and effect the desired reaction.

Of primary concern in all steam cracking process configurations is the formation of coke. When hydrocarbon feedstocks are subjected to the heating conditions prevalent in a steam cracking furnace, coke deposits tend to form on the inner walls of the tubular members forming the cracking coils. Such coke deposits interfere with heat flow through the tube walls into the stream of reactants, which results in higher tube metal temperatures, ultimately reaching the limits of the tube metallurgy. Additionally, the coke deposits interfere with the flow of the reaction mixture resulting in higher pressure drop, due to reduced tube cross sectional area.

The optimum way of improving selectivity to ethylene was found to be by reducing coil volume while maintaining the heat transfer surface area. This has been accomplished by replacing large diameter, serpentine coils with a multiplicity of smaller diameter tubes having a greater surface-to-volume ratio than the large diameter tubes. The tubes typically have inside diameters up to about 7.6 cm (3 inches), generally from about 3.0 cm to 6.4 cm (1.2 to 2.5 inches).

The desire for short residence times has led to the use of shorter coils, typical lengths being progressively reduced over the years from over 45 m (150 ft.) to 20 m–27 m (60–90 ft.) and more recently 9 m–12 m (30–40 ft). As coils have been reduced in length, it has been necessary to reduce the tube diameter in an effort to reduce the heat flux and hence the tube metal temperatures. Current cracking coils are generally constructed from high alloy (25% Cr, 35% Ni, plus additives) austenitic stainless steels, and are operated at maximum tube metal temperatures in the range 1030–1150 degrees C. (1900–2100 degrees F.).

Despite the significant evolution of cracking furnace design, the process is still limited by the fact that it makes as a byproduct coke, which deposits on the inside of the coils. The coke acts as an insulator, and hence increases the tube metal temperatures of the coil. When the tube metal temperature reaches the maximum capability of the material it is necessary to cease production and decoke the furnace. This is generally carried out by passing a mixture comprising air and steam through the coils at high temperature. The coke is removed by a combination of combustion and erosion/spalling. Other decoking techniques which avoid the use of air are also used in the industry. In this case the coke is removed primarily by erosion/spalling and gasification. Regardless of the decoking technique that is used some of the spalled coke is in the form of large particles. As tube diameters have decreased the likelihood of large coke particles plugging the coil before or during decoking have increased. Decoking typically takes from 12–48 hours, depending on a variety of factors including: the furnace design, the feed that was cracked, the operating time before the decoke, and the cracking severity employed.

Technology to reduce tube metal temperatures (and hence coking rates, or alternatively to allow a shorter residence time coil to be used) has been widely sought by the industry. Some designers have resorted to multiple inlet leg coils to reduce the heat flux on outlet tubes (e.g.; EP 0 305 799 A1). Others have attempted to prevent the formation of the insulating coke layer inside the tube by adding small concentrations of specific elements to the reactor feed.

Heat transfer to the highly endothermic cracking reaction may be represented by the familiar equation $Q = U \times A \times \Delta T$. $U$, the heat transfer coefficient is a function of the gas velocity inside the tube. Higher velocities increase $U$, and hence reduce the required $\Delta T$ (temperature difference) thus reducing tube metal temperature for a given process fluid temperature. However, as velocities increase, pressure drop increases, increasing the coil average hydrocarbon partial pressure. Eventually the pressure effect over-rides the effect of reduced residence time, and further increases in velocity reduce reactor selectivity to ethylene. This represents a maximum practical value to $U$.

Overall area (A) may be increased by using multiple small diameter tubes. This trend has been pursued by the industry, resulting in reactors with tubes of inside diameter 2.5 cm–3.8 cm (1.0–1.5 inch). This represents a minimum practical diameter due to manufacturing limitations, and below these diameters the effects of coke build-up inside the tube becomes excessive.

The general principle of increasing internal surface area to improve heat transfer is well known in the general heat transfer art. However, applying this principle to very high temperature coking services like steam cracking is difficult.

Nevertheless, this method of improving heat transfer to reduce the tube metal temperatures in steam cracking furnaces has been proposed in several varieties. One example (U.S. Pat. No. 4,342,242) uses a specially designed longitudinal insert in an otherwise circular tube cross section. The insert has a central body and outwardly extending vanes which contact the interior of the coil. In this particular disclosure the insert is positioned in only a portion of the overall tubular coil in the furnace. Another example (GB 969,796) utilizes internally rounded channels or fins which enhance the inside area. The internal profile was smooth to avoid stress concentrations and flow disturbances. The specific tubes described in this disclosure made 4 passes through the radiant section and had a relatively large 9.525 cm (3.75 inch) inside diameter.

Variations of this rounded internal channels or finned tube profile have been applied commercially in specific coil designs. A paper presented at an American Institute of Chemical Engineers Meeting ("Specialty Furnace Design Steam Reformers and Steam Crackers" by T. A. Wells, presented at the 1988 AIChE Spring National Meeting, New Orleans, La., Mar. 6–10, 1988) discloses the use of a type of extended internal surface tube in a single tube pass design. The inlet legs of longer coils (EP 0 305 799 A1) and a literature reference for this design, denominated SRT V (Energy Progress Vol. 8, No. 3, p. 160–168, September 1988) have utilized internal extended surface. In both of the latter cases the commercial use was based on tubes of approximately 2.5–3.8 cm (1.0–1.5 inch) inside diameter and where the tube section that had the rounded internal channels or fins made only a single pass through the furnace radiant section. Another literature reference ("USC Super U Pyrolysis Concept" by David J. Brown, John R. Brewer and Colin P. Bowen presented at the AIChE Spring National Meeting in Orlando, Fla., March 1990) presents data on tubes with internal fins on the inlet leg. This reference speculates that providing fins on the outlet leg would be beneficial, however it provides no suggestion as to what operating or design parameters would be required to successfully demonstrate or enable the use of fins on the outlet leg.

However, an extended internal surface design to this time, has not been shown to be feasible in two pass coils typically made up of U shaped tubes. These two pass coils are typically 15 m–27 m (50–90 ft.) in total length, with internal diameters in the range 3.8 cm–6.4 cm (1.5–2.5 inch). Two pass coils can be as short as 13 m (40 ft). One problem is that the capability to make an internally finned tube long enough to form the complete U shaped tube does not exist.

An internally finned tube could be used just for the inlet half of the U shaped tubes, as described in EP 0 305 799 A1 which uses internal fins, studs or inserts only on the inlet tubes to the furnace—not the outlet. This reference discloses that inserts located in the outlet tube would be expected to act as nucleus for the growth of the coke formed during pyrolysis. However, the highest tube metal temperatures occur near the outlet end, so the advantageous effect of the finned tube is not applied to where it is most needed. Applying the finned tube to the outlet leg of the coil would be possible, but it carries the risk that coke pieces from the inlet leg could break loose and become lodged at the start of the finned section. Finally, the industry conventional wisdom suggested that a bent finned tube section would be prone to plugging with coke spalled from the inlet leg of the coil.

In light of the known deficiencies in heat transfer in steam cracking furnaces there is a need for a means to increase the heat transfer in the inside of the tubes to reduce coking, tube metal temperature and improve ethylene selectivity. Particularly, it would be highly desirable to have a design for a 2 pass coil or U shaped tubes that uses some means of increased internal surface area to reduce tube metal temperature throughout its entire length.

SUMMARY OF THE INVENTION

The present invention is directed towards a fired heater for heating a process fluid that provides increased internal heat transfer surface to reduce tube metal temperatures at the inlet and outlet of a U shaped tube and at the same time is not prone to plugging from coke. The fired heater comprises a radiant section enclosure having a plurality of U shaped tubes disposed therein, an inlet for introducing the process fluid into the U shaped tubes, burners for exposing the external surface of the U shaped tubes to radiant heat, an outlet for cooling and collecting the process fluid from the U shaped tubes, wherein the U shaped tubes are formed by connecting one or more tubular sections; and at least the outlet leg of the U shaped tubes are provided with internal generally longitudinal fins. In another embodiment the entire length of the U shaped tubes are provided with internal generally longitudinal fins.

DRAWINGS

These and other features, aspects and advantages of the present invention will become better understood with regard to the following drawings, description and appended claims.

DETAILED DESCRIPTION OF THE INVENTION

The present invention describes a fired heater for heating a process fluid. More particularly the invention is directed towards a fired heater heating a process fluid which is prone to forming coke as a result of chemical reactions occurring as a result of the heating. A specific embodiment of the invention is a steam cracking furnace employed in the petrochemical industry to manufacture olefins.

Figure 1:
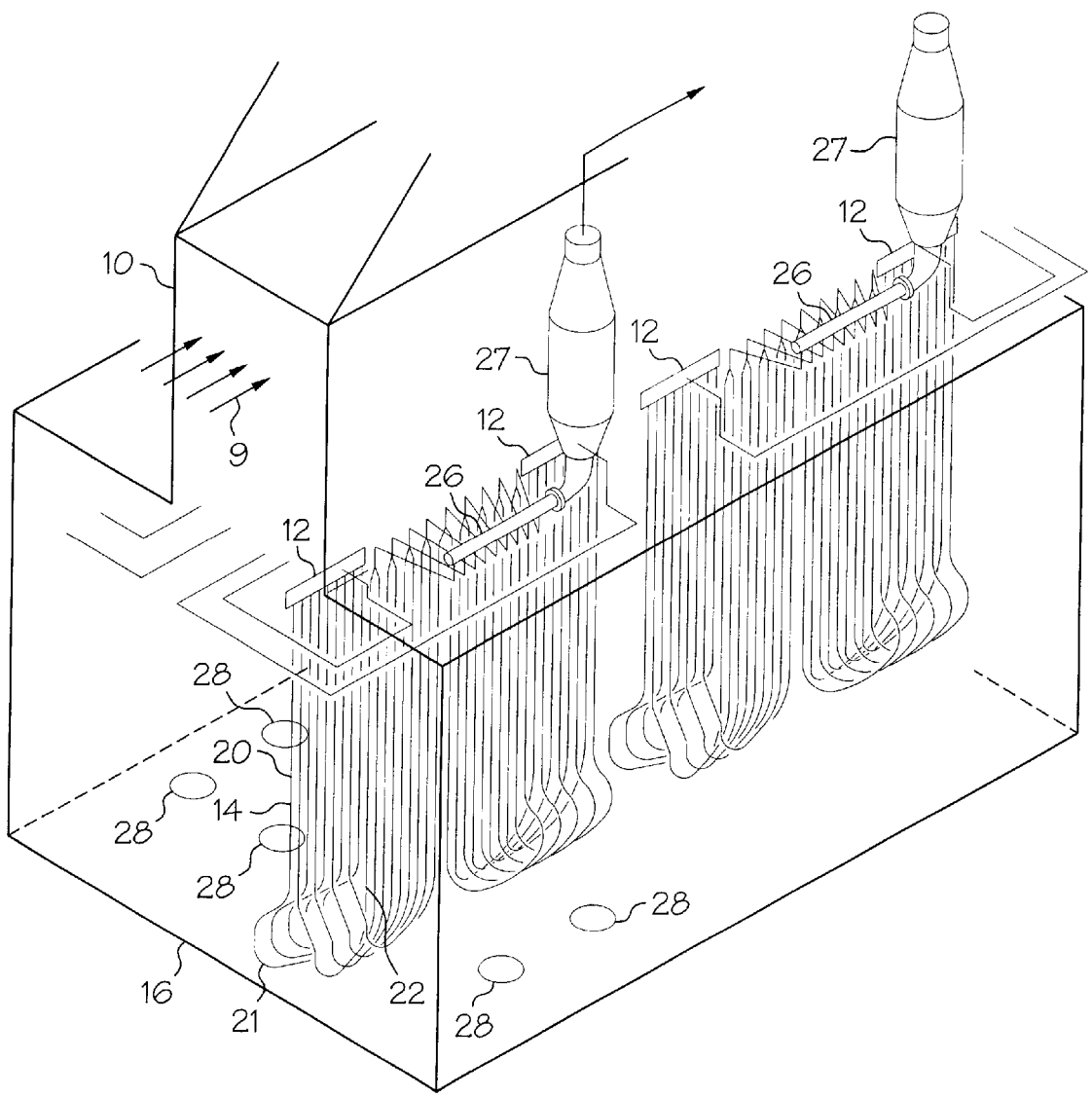
FIG. 1 represents a three dimensional drawing of a steam cracking furnace showing a typical arrangement of internals.

Referring to FIG. 1 the feed stream 9 enters the convection section 10, through one or more inlet lines 9 where it is preheated preferably to a temperature from about 800° F. to 1500° F. by hot combustion gases which gases are preferably are at a temperature from about 1500° F. to about 2400° F., before it enters the radiant section inlet distributor 12. From the radiant section inlet distributor 12 the preheated feed enters the U shaped tubes 14 (hereinafter referred to as U tubes) which are situated inside the radiant section enclosure 16, also known in the art as the radiant box.

The radiant section enclosure 16 is typically lined with heat insulating refractory material to conserve heat energy.

The radiant section enclosure includes a plurality of U tubes. The end of the U tubes which are connected to one or more feed inlet distributors 12 which introduce the process fluid into the U tubes are called inlet legs 20. The opposite end of each of the U tubes 22 called the outlet leg is connected to an outlet header 26 for collecting the process fluid after it has been heated and the thermal cracking reactions have occurred. The temperature of the process fluid is typically from about 1300° F. to about 2000° F. leaving the outlet leg of the U tube. From there the process fluid is passed to quench exchanger 27 which cool the process fluid to stop the thermal cracking reactions. In another embodiment, not depicted in FIG. 1, the outlet leg of each U tubes is directly connected to an individual quench exchanger to cool the process fluid. The outlet from each individual quench exchanger is then connected to an outlet header. Such an arrangement is know in the art as a close coupled transfer line exchanger. In yet another embodiment not depicted in FIG. 1, the outlet leg of each U tube is connected to a quench point whereby the process fluid is directly contacted with a quench liquid which vaporizes to cool the process fluid.

Figure 2:
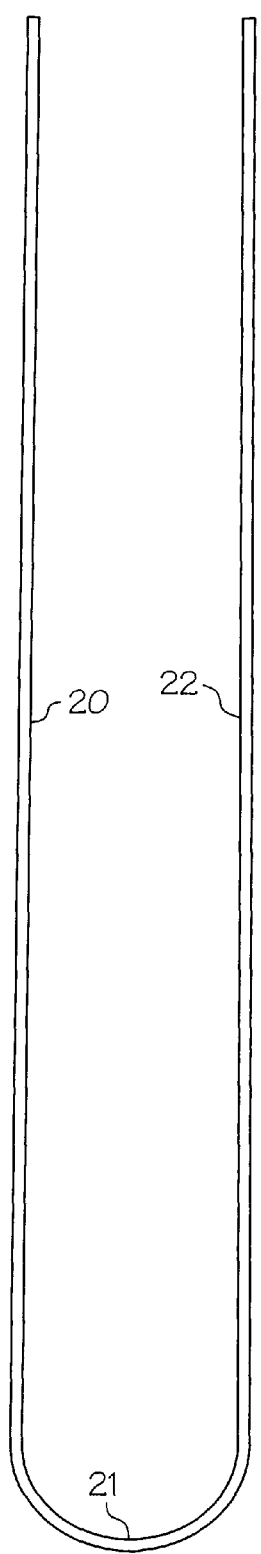
FIG. 2 shows a single U shaped furnace tube.

For the purposes of this invention U tubes are shaped somewhat like the letter "U" when viewed in a two dimensional drawing such as FIG. 2. A defining characteristic is that the U tube makes effectively 2 passes through the radiant enclosure. The U tubes are comprised of an inlet leg 20, an outlet leg 22, and a curved or bent portion 21 connecting the inlet leg 20 and the outlet leg 22. In other embodiments the outlet leg can be comprised of one or more branched portions. In yet other preferred embodiments the inlet leg 20 can be comprised of more than one branched tube. There are a variety of ways known in the art of arranging a plurality of U tubes in a radiant enclosure. Those skilled in the art will consider spatial arrangement, location of the burners, location of the inlet header and outlet means, and thermal stresses on the U tubes themselves in choosing the arrangement. In some arrangements each of the individual U tubes lies in a single plane. In other arrangements the U tubes are bent out of plane. All such arrangements are contemplated as U tubes for the purposes of this invention.

The radiant section enclosure contains a plurality of burners 28 for exposing the external surface of the U shaped tubes to radiant heat. A wide variety of burner types known in the art can be used including raw gas or pre-mixed burners. Recent designs have additionally used a variety of flue gas recirculation techniques to reduce $NO_x$ formation for environmental reasons. The combustion air source can be from ambient air, preheated air or from gas turbine exhaust.

The total length of the U tubes is preferably 20 m–27 m (60–90 ft). Since it is difficult to manufacture the internally finned tubes in the desired 20 m–27 m (60–90 ft) length, two sections might need to be connected with at least one intermediate weld. As described in U.S. Pat. No. 4,827,074 intermediate welds are known to be a potential source of accelerated coke deposition. In one preferred embodiment this potential coke deposition is minimized in U tubes with one intermediate weld at the bottom of curved portion of the U and arranging the U tubes such that the weld is shielded from direct radiation by the adjacent tubes. In another embodiment the weld area may be wrapped by insulating material.

The internally finned tubes can be successfully bent to the radius required at the bottom of the U tube using either well-known cold-bending, or hot-induction bending techniques.

Whether the U tubes are formed by connecting two or more tubular sections or are formed in one piece, preferably the entire length of the finned U tubes are provide with internal generally longitudinal fins. Another embodiment would provide the fins on the outlet leg only. In yet another embodiment the fins are provided in the curved portion of the U tube and the outlet leg.

Figure 3:
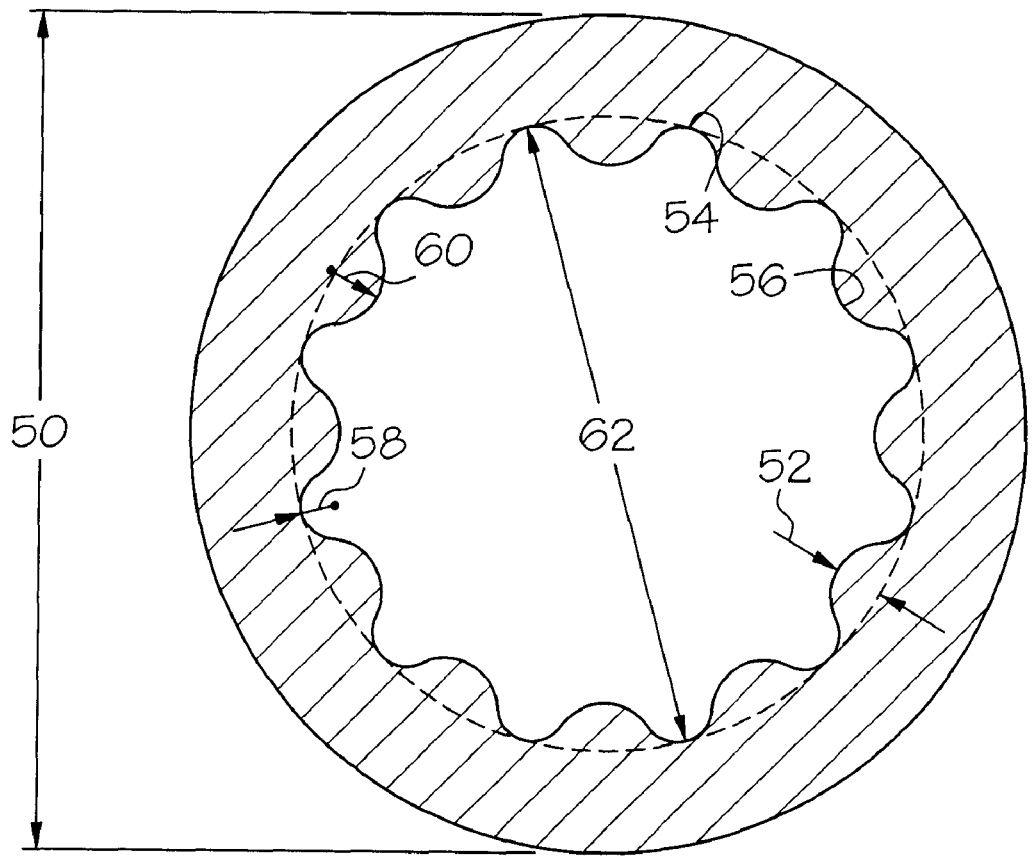
FIG. 3 shows a cross section of finned U shaped furnace tubes.

FIG. 3 shows a cross sectional view of a U tube provided with fins. The outer tube diameter 50 is in the range of 1.75 inch to 4.5 inch (4.4 cm to 11.4 cm), preferably 2.0 to 3.0 inch (5 cm to 7.6 cm). The fin height 52 defined as the distance between the bottom of the fin root 54 and the top of the fin tip 56 is in the range of from about 0.05 inch to about 0.4 inch (0.13 cm to 1 cm), preferably from 0.1 inch to 0.25 inch (0.25 cm to 0.65 cm). The number of fins around the inside circumference of the tubes is from 8 to 24, preferably from 10 to 18. The radius of fin root 58 and fin tip 60 is in the range of from about 0.05 to about 0.45 inch (0.13 cm to 1.2 cm), preferably 0.1 inch to 0.2 inch (0.25 cm to 0.5 cm). In one embodiment the fin root radius and fin tip radius are equal. The inside diameter 62, defined as the distance through the center of the tube from fin root to fin root is in the range of from about 1.25 inch to 3.0 inch (3.2 cm to 7.6 cm), preferably from 1.5 to 2.5 inch (3.8 cm to 6.4 cm), more preferably from 2.0 inch to 2.5 inch (5 cm to 6.4 cm). The ratio of the fin height to inside diameter necessary to provide improved heat transfer, not have excessive pressure drop and also not be prone to plugging is preferably in the range of from 0.05 to 0.20, more preferably in the range of from 0.07 to 0.14.

The generally longitudinal fins may be straight throughout the length of the U tube or helical, analogous to the rifling of a gun barrel. The latter longitudinal fin arrangement is also referred to as spiral longitudinal fins.

Where more than one section is required, to form the U shaped tube, the fins are preferably aligned at each connection to reduce the likelihood of coke particles being trapped at the edge of the fins.

EXAMPLES

A test program was conducted to determine if the expected limitations could be overcome, and the advantages of increased internal surface area could be applied to a U tube steam cracking furnace design.

Twenty-two internally finned U tubes were installed in a quadrant of a commercial steam cracking furnace (88 total U tubes). The feedstock furnace was commercial ethane (98% ethane) recovered from natural gas separation facilities. Thus the majority of the U tubes in the furnace remained as conventional circular cross-section tubes, while one quarter of the tubes had straight longitudinal fins according to the invention. This provided a direct comparison of the performance of the finned tubes compared to the conventional circular cross-section (bare) tubes. FIG. 3 can be used to describe the fin arrangement of the U tubes in the finned tube test quadrant. The outside diameter 50 of the U tubes was 2.75 inch. The inside diameter 62 of the U tube was 2.0 inch. There were 12 fins. The fin height 52 was 0.16 inch. The fin root radius 58 and the fin tip radius 60 were both 0.16 inch. The ratio of fin height to inside diameter was 0.08.

Since it was difficult to make the internally finned tubes in the desired 65 ft. (20 m) length one intermediate weld was required. This intermediate weld was placed at the bottom of each of the U tubes, where it was shielded from direct radiation by the adjacent tubes. The fins were aligned at this connection.

The bent portion of the U-coil was not prone to blockages, as has been suggested by the prior art. No sudden pressure drop increases were observed during the 12 month test program.

The internally finned tube reduced tube metal temperatures. The test coil developed coke deposits at a much slower rate than the conventional circular cross-section (bare) tubes in the very same steam cracking furnace, with the very same feedstock.

TABLE 1

Pressure Drop
(Radiant inlet-Radiant outlet)

| | ΔP, bars | |
|---|---|---|
| Days Onstream | Bare (Conventional) Tubes | Finned Tubes |
| 0.5 | 0.28 | 0.28 |
| 2.5 | 0.43 | 0.36 |
| 4.5 | 0.52 | 0.38 |
| 8 | 0.75 | 0.38 |
| 11 | 0.83 | 0.38 |
| 15 | 0.90 | 0.40 |
| 21 | 1.48 | 0.50 |

Table 1 shows the pressure drop for the U shaped coils as a function of days since onstream, that is days since the last decoke. The higher the pressure drop, the greater the coke thickness that has formed. The table compares the bare (conventional) tubes with the finned tubes. As can be seen from the data the pressure drop increased significantly more during the course of the run for the bare tubes versus the finned tubes, indicating greater coke thickness in the bare tubes. Also the significantly lower pressure drop for the finned tubes clearly indicates that no plugging occurred during the run.

TABLE 2

Tube Metal Temperature

| | Tube Metal Temperature, °C. | |
|---|---|---|
| Days Onstream | Bare (Conventional) Tubes | Finned Tubes |
| 0.5 | 1016 | 1004 |
| 2.5 | 1031 | 1003 |
| 4.5 | 1037 | 1007 |
| 8 | 1048 | 1016 |
| 11 | 1050 | 1022 |
| 15 | 1041 | 1018 |
| 21 | 1056 | 1028 |
| Average | 1040 | 1014 |

Table 2 shows the maximum tube metal temperature measured with an infrared pyrometer again as a function of the days onstream. As described earlier it is critically important to reduce the maximum tube metal temperature. Tube metal temperatures were significantly lower during the entire course of the run for the finned tubes versus the conventional (bare) tubes, averaging about 26 degrees C. (47 degrees F.) lower.

Additionally the internally finned tubes required much less time than the conventional circular cross-section tubes for decoking. For ethane cracking the conventional (bare) tubes required a range of 8–10 hours for decoking but the finned tubes required a range of 4–5 hours.

Without wishing to be limited to a specific theory of operation, it appears that the finned U tubes configured as described by this invention provide for fracture zones in the coke layer at the location of each of the fins, such that small pieces of coke are especially prone to spall off or break away from the inside of the tube during the decoking process. This has two extremely important and unexpected effects compared to conventional bare tubes. Firstly, it makes the decoking process take less time thereby allowing the furnace to be put into full productive operation sooner, thus providing a significant economic benefit to the operator. Secondly, the fracture zones favor forming only relatively, small coke particles, which have been found not to plug or block the tubes, even relatively small diameter tubes in the 1.2 to 2.5 inch range and even the bent or curved section of the "U" in 2 pass U tubes.

A preferred means of operating a furnace with internally finned U tubes according to the invention is such that the coke layer buildup is not excessive, in order to favor the spalling of small particles of coke. Preferably the average coke thickness should not exceed about 1.5 times the fin height. The coke thickness in an operating pyrolysis furnace can be estimated by one skilled in the art from operating data on the furnace and knowledge of the cracking characteristics of the feedstock. The coke thickness is calculated based on measured tube metal temperature profiles, measured pressure drop for the tubes inside the radiant enclosure, the known or measured density and thermal conductivity of the coke. One skilled in the art can use the above measured parameters in well known fluid flow and heat transfer equations to estimate the coke thickness in an operating furnace and schedule decoking operations accordingly.

Although the present invention has been described in considerable detail with reference to certain preferred embodiments, other embodiments are possible. Therefore, the spirit and scope of the invention should not be limited to the description of the preferred embodiments contained herein.

We claim:

1. A process for the manufacture of olefins comprising:
    (a) introducing a hydrocarbon feedstock into a radiant section comprising a plurality of U tubes, wherein each U tube has internal generally longitudinal fins over its entire length and an inside diameter of from about 125 inches to about 3.0 inches; and
    (b) heating the radiant section to convert the hydrocarbon feedstock to a thermally cracked product.

2. The process of claim 1 further comprising before step (a); preheating a hydrocarbon feedstock.

3. The process of claim 1 further comprising: collecting the thermally cracked product from the radiant section.

4. The process of claim 3 further comprising: cooling the thermally cracked product.

5. The process of claim 4 further comprising: recovering at least one olefin from the thermally cracked product.

6. The process of claim 1 wherein each U tube has an inside diameter of from about 1.5 inches to about 2.0 inches.

7. The process of claim 1 wherein each U tube has an inside diameter of from about 2.0 inches to about 2.5 inches.

8. The process of claim 1 wherein the total length of each U tube is from about 40 feet to about 90 feet.

9. The process of claim 1 wherein the total length of each U tube is from about 50 about 90 feet.

10. The process of claim 1 wherein the internal generally longitudinal fins have a fin height of 0.05 to 0.40 inch.

11. The process of claim 10 wherein the ratio of fin height to inside diameter is in the range of from 0.05 to 0.20.

12. The process of claim 10 wherein the ratio of fin height to inside diameter is in the range of from 0.07 to 0.14.

13. The process of claim 1 wherein from 8 to 24 internal generally longitudinal fins are spared around the inside circumference of the tube.

14. The process of claim 1 wherein the internal generally longitudinal fins have a fin root radius in the range of 0.05 to 0.45 inch.

15. The process of claim 1 wherein the internal generally longitudinal fins have a fin tip radius in the range of 0.05 to 0.45 inch.

16. The process of claim 1 wherein the internal generally longitudinal fins have an essentially equal radius for the fin root and fin tip.

17. A process for the manufacture of olefins comprising:
 (a) preheating a hydrocarbon feedstock;
 (b) introducing a hydrocarbon feedstock into a radiant section comprising a plurality of U tubes, wherein each U tube has internal generally longitudinal fins over its entire length and an inside diameter of from about 1.25 inches to about 3.0 inches;
 (c) heating the radiant section to convert the hydrocarbon feedstock to a thermally cracked product;
 (d) collecting the thermally cracked product from the radiant section;
 (e) cooling the thermally cracked product; and
 (f) recovering at least one olefin from the thermally cracked product.

18. The process of claim 17 wherein each U tube has an inside diameter of from about 1.5 inches to about 2.0 inches.

19. The process of claim 17 wherein each U tube has an inside diameter of from about 2.0 inches to about 2.5 inches.

20. The process of claim 17 wherein the total-length of each U tube is from about 40 feet to about 90 feet.

21. The process of claim 17 wherein the total length of each U tube is from about 50 feet to about 90 feet.

22. The process of claim 17 wherein the internal generally longitudinal fins have a fin height of 0.05 to 0.40 inch.

23. The process of claim 22 wherein the ratio of fin height to inside diameter is in the range of from 0.05 to 0.20.

24. The process of claim 22 wherein the ratio of fin height to inside diameter is in the range of from 0.07 to 0.14.

25. The process of claim 17 wherein from 8 to 24 internal generally longitudinal fins are spaced around the inside circumference of the tube.

26. The process of claim 17 wherein the internal generally longitudinal fins have a fin root radius in the range of 0.05 to 0.45 inch.

27. The process of claim 17 wherein the internal generally longitudinal fins have a fin tip radius in the range of 0.05 to 0.45 inch.

28. The process of claim 17 wherein the internal generally longitudinal fins have an essentially equal radius for the fin root and fin tip.

* * * * *

UNITED STATES PATENT AND TRADEMARK OFFICE
CERTIFICATE OF CORRECTION

PATENT NO. : 6,719,953 B2
DATED : April 13, 2004
INVENTOR(S) : Arthur R. Di Nicolantonio et al.

It is certified that error appears in the above-identified patent and that said Letters Patent is hereby corrected as shown below:

Column 8,
Line 41, replace "125" with -- 1.25 --.

Signed and Sealed this

Third Day of May, 2005

JON W. DUDAS
*Director of the United States Patent and Trademark Office*